PULSE OPERATED SWITCHING APPARATUS OF THE CROSSBAR TYPE

Filed June 21, 1950 4 Sheets-Sheet 1

INVENTORS.
KENNETH W. GRAYBILL
HANS SENGEBUSCH
BY Chas. W. Cauley
ATTORNEY

PULSE OPERATED SWITCHING APPARATUS OF THE CROSSBAR TYPE

Filed June 21, 1950

INVENTORS.
KENNETH W. GRAYBILL
HANS SENGEBUSCH
BY
Chas. W. Candy
ATTORNEY

PULSE OPERATED SWITCHING APPARATUS OF THE CROSSBAR TYPE

Filed June 21, 1950 4 Sheets-Sheet 3

INVENTORS.
KENNETH W. GRAYBILL
HANS SENGEBUSCH
BY [signature]
ATTORNEY

June 8, 1954 K. W. GRAYBILL ET AL 2,680,783

PULSE OPERATED SWITCHING APPARATUS OF THE CROSSBAR TYPE

Filed June 21, 1950 4 Sheets-Sheet 4

INVENTORS.
KENNETH W. GRAYBILL
HANS SENGEBUSCH
BY
[signature]
ATTORNEY

Patented June 8, 1954

2,680,783

UNITED STATES PATENT OFFICE 2,680,783

PULSE OPERATED SWITCHING APPARATUS OF THE CROSSBAR TYPE

Kenneth W. Graybill, Elmhurst, and Hans Sengebusch, Villa Park, Ill., assignors to Automatic Electric Laboratories, Inc., Chicago, Ill., a corporation of Delaware Application June 21, 1950, Serial No. 169,478

10 Claims. (Cl. 179—27.54)

The present invention relates in general to switching apparatus, and more particularly to improvements in switching apparatus of the pulse-operated type primarily for use in automatic and semi-automatic telephone systems.

It is an object of the invention to provide a switching arrangement whereby a plurality of subscribers' line circuits are associated with a multiple field of bare conductors, and a plurality of trunk circuits are associated with a plurality of pulse-operated switches, new and novel means being included so that any pulse-operated switch can connect its associated trunk circuit with any subscriber's line circuit.

Another object of the invention is to provide a novel pulse-operated switch for use in association with a multiple field of bare conductors so that connections of one set of circuit conductors can be established to another set of circuit conductors in a simple and efficient manner.

A further object of the invention is to provide a new and improved pulse-operated switch which is economical to manufacture and simple to maintain.

A still further object of the invention is to provide a new and novel pulse-operated switch which can be controlled either as a line finder for outgoing calls from subscribers' line circuits or as a connector for incoming calls to subscribers' line circuits.

A feature of the invention, in addition to the inclusion of a simple line circuit multiple field consisting of bare conductors, resides in the arrangement of the pulse-operated switch trunk circuit conductors. Each trunk circuit conductor comprises a metallic strip spanning the multiple field conductors but having no normal electrical connections therewith, and a conductor member depending from the metallic strip for a corresponding bare conductor of each line circuit in the multiple field, these depending conductor members being adapted to be pressed into electrical contact with the respective line circuit conductors in the multiple field. Each such conductor strip and its depending conductor members are stamped from a single piece of electrical conducting material, preferably spring stock, and, therefore, the strip serves to multiple the depending conductor members together so that no multiple wiring is required therefor.

Another feature of the invention relates to the provision of a switching arrangement wherein a plurality of sets of movable conducting elements representing a trunk circuit associated with a pulse-operated switch are arranged in co-operative relationship with a plurality of sets of stationary conducting elements representing respective line circuits, novel mechanical means controlled by the functioning of the pulse-operated switch being provided for urging a particular one of the sets of movable conducting elements into electrical contact with the corresponding set of stationary conducting elements.

A further feature of the invention concerns a novel latching arrangement for automatically locking a trigger bar of a pulse-operable switch in an operated off-normal position.

A still further feature of the invention relates to the novel manner in which a locked operated trigger bar of a pulse-operable switch is automatically restored to its normal, or home, position.

Another feature of the invention resides in the provision of novel means for locking a plurality of secondary shafts of a pulse-operable switch against rotation while a primary shaft of the switch is being rotated, the provision of novel means for freeing one of the locked secondary shafts for rotation after the primary shaft has been rotated, and the provision of novel means for rotatively locking the primary shaft and the freed secondary shaft together in order that these two shafts can then be rotated as one unit.

Another feature of the invention is the novel arrangement whereby the two rotated shafts of a pulse-operable switch are further rotated as one unit for causing the restoration of one of the rotated shafts to its home, or normal, position and locking it against further rotation, and the novel arrangement whereby the other shaft is further rotated to its home, or normal, position independent of the other locked shafts of the switch.

There are other objects and features of the invention having to do for the most part with the details in carrying out the foregoing. The various objects and features of the invention will be understood best from a further perusal of the description in connection with the accompanying drawings which show a preferred embodiment of the invention by way of example.

Referring now to the drawings, Fig. 1 is a top view, in elevation, showing the group of vertically disposed subscriber line bare-wire multiple panels and the uppermost horizontally disposed switch unit.

Figure 1:
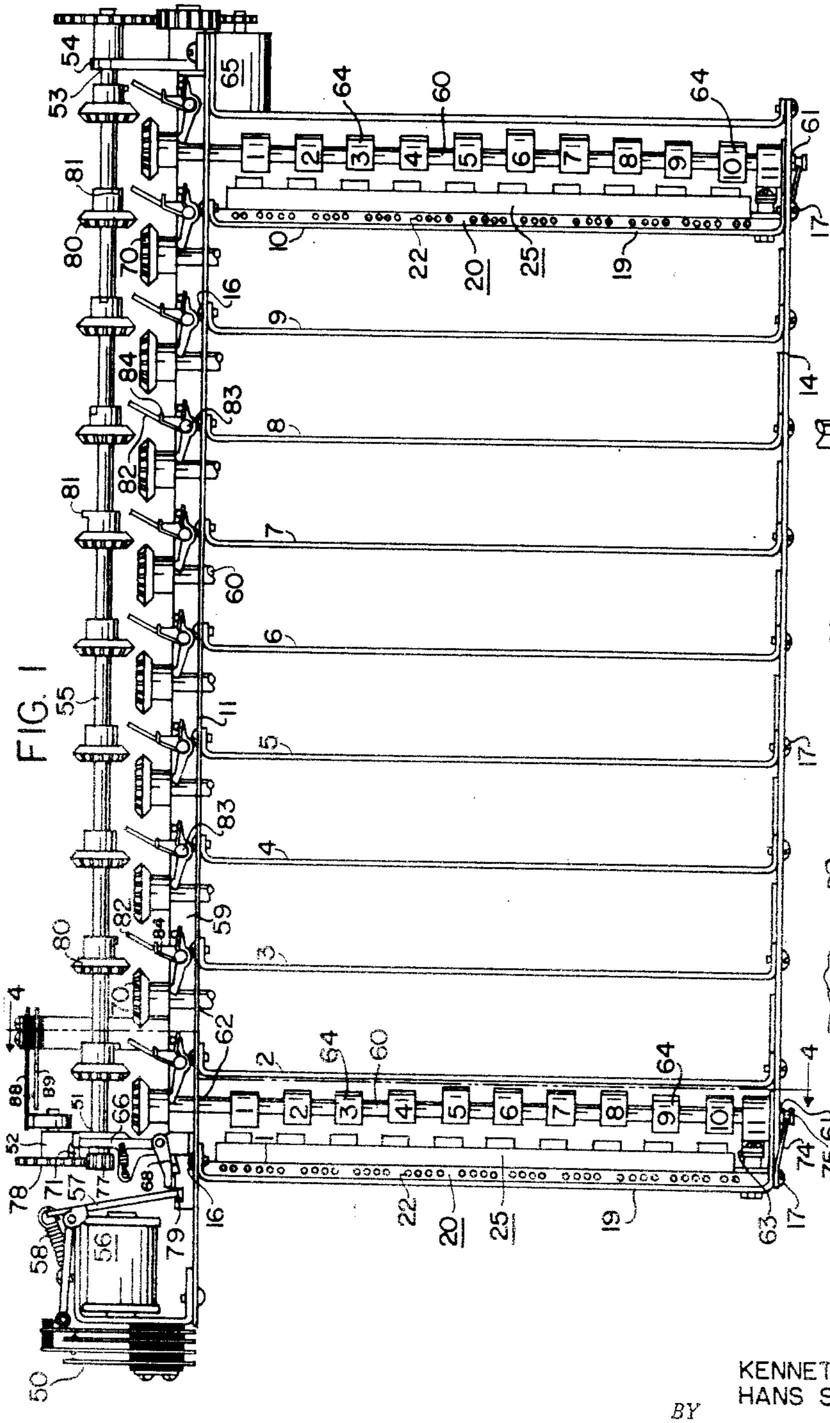
Figure 2:
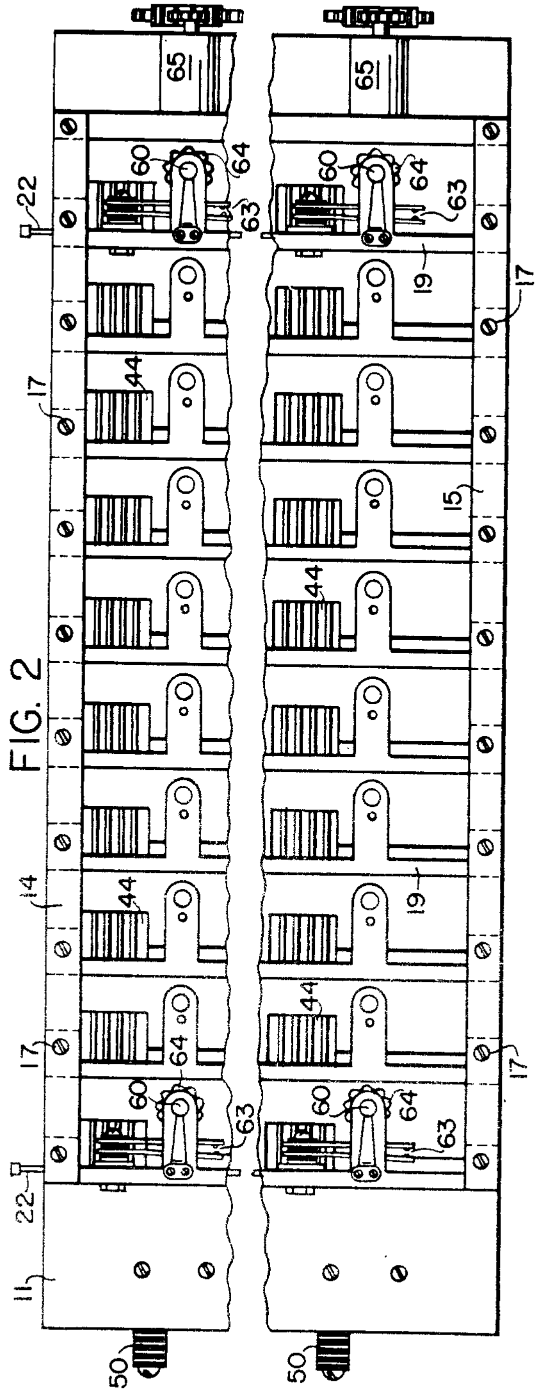
Fig. 2 is a partial front view, in elevation, showing the uppermost and the bottom horizontally disposed switch units and also the panels of vertically disposed bare-wire multiples common to all switch units.

Referring more particularly to Figures 1 and 2, there is illustrated an assembly comprising a plurality of bare-wire mutiple panels 20 mounted in parallel relationship to each other and spaced at suitable intervals. Fig. 1 provides spacing for 10 panels, panels #1 and #10 being shown in full and only the frameworks for panels #2 to #9, inclusive, it being understood that panels #2 to #9, inclusive, have been omitted to simpify the drawing. One end of each panel 20 is securely fastened to a back plate 11 (preferably of metal) by means of suitably spaced screws 16. The other end of each panel 20 is securely fastened to a top strip 14, a bottom strip 15 and intermittent strips (not shown) by means of screws 17. It should be understood, however, that any other suitable means of anchoring the bare-wire multiple panels 20 can be employed, as desired.

Figure 5:
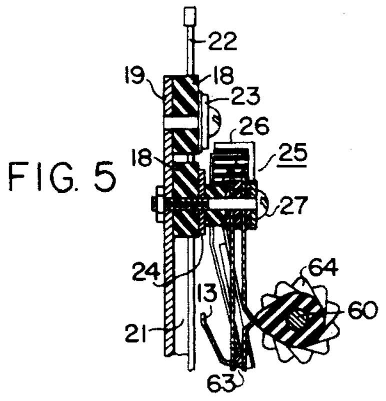
Fig. 5 is a sectional view taken along the line 5—5 in Fig. 4 showing the assembly of the two upper slotted spacer strips on the back plate of the bare-wire multiple panel.

Referring now to the front view (Fig. 7) of the bare-wire multiple panel 20, and also to Fig. 1, the frame of panel 20 consists primarily of a channel-shaped back plate 19. Across the top of back plate 19 and also across the bottom of back plate 19 is mounted, in any suitable manner, a slotted spacer strip 18 of insulating material (best seen in the sectional views of Figs. 5 and 6) for supporting the bare multiple wires 22. Additional slotted spacer strips 18 are similarly mounted on back plate 19 at definite spaced apart points for additionally supporting the bare multiple wires and for providing mounting facilities for the wiper assemblies 25 of the related switch units. The assembly of the slotted spacer strips 18 on back plate 19 provides a number of generally rectangular openings 21 arranged one above the other so that the frame has an appearance somewhat ladder-like. The number of openings 21 are dependent upon the number of horizontally disposed units to be mounted in association with the bare-wire multiple panels 20, one opening generally being required for each such switch unit. The frame of panel 20 may be provided with any number of openings 21, limited only to the desired maximum height of the frame, the vertical frame members of panel 20 in Fig. 7 being broken to indicate this flexibility.

Panel 20 is equipped with 40 vertically disposed bare wire conductors 22 mounted in four-conductor groups comprising, for example, 10 subscriber line multpiles. It is obvious that each line multiple may include more than four bare wire conductors or less than four bare wire conductors, and also that the number of line multiple groups may be less or more than 10.

Figure 6:
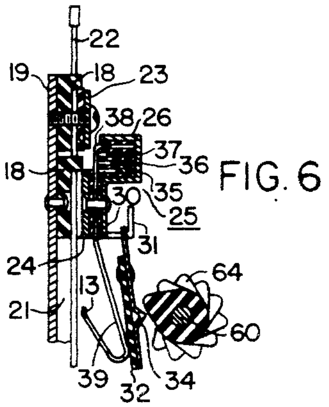
Fig. 6 is a sectional view taken along the line 6—6 in Fig. 4 showing a wiper spring, wiper actuator, cam follower plate, and cam associated with the first group of bare wire multiples.
Figure 7:
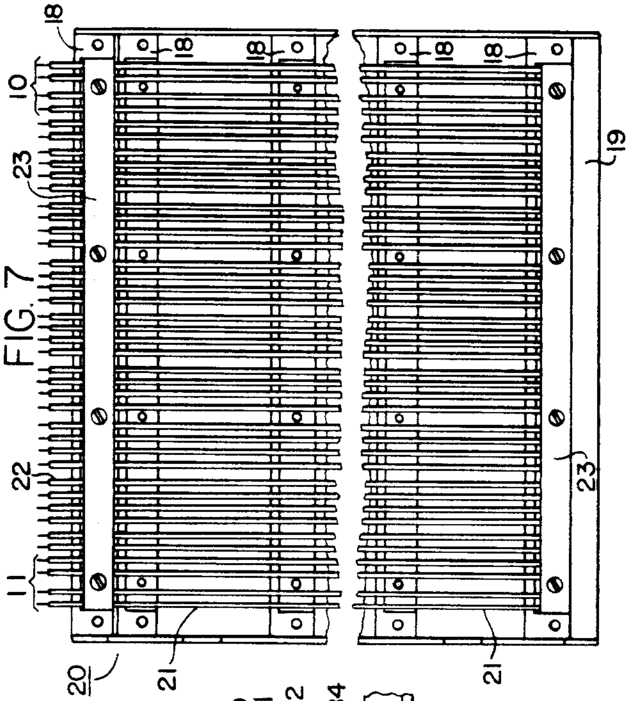
Fig. 7 is a front view, in elevation, of one of the panels of the vertically disposed bare-wire multiples showing the general structural arrangement of the frame proper and the manner in which the vertical bare wires are threaded through the horizontal members of the frame.

The vertically disposed bare wire conductors 22 are secured in the bottom horizontal frame member of panel 20 and then successively pass through the bottom rectangular opening 21, slots in the next above horizontal frame member 20 and so on through other rectangular openings 21 and slots in other frame members of panel 20 until the conductors pass through slots in the top horizontal frame member of panel 20. At this point the conductors rise a suitable distance above the top horizontal frame member of panel 20 where they are connected to terminals or wiring according to circumstance. The conductors 22 are held rigidly in the slots of the horizontal frame members of panel 20 by means of cross strips 23 fastened to the horizontal frame members of panel 20 as shown in Fig. 6, and in the rectangular openings 21 the conductors 22 serve as wiper contacts for the related switch units. The conductors 22 consist of stiff bare wires or other suitable material preferably circular in cross section but may be of square, rectangular, or other cross section.

It will thus be seen that the assembly is equipped with 10 bare-wire multiple panels 20 representing a total of 100 subscriber line circuits, each line multiple comprising four bare wire conductors 22. These 100 line multiple groups may be wired out to suitable terminals in any conventional manner, at which point the 100 line multiple groups may be cross-connected to the line and cut-off relay circuits of 100 subscribers' lines, also in any suitable conventional manner. Since line and cut-off relay circuits are not part of the present invention, such relays need not be directly associated with the assembly of bare-wire multiple panels 20, but may be mounted on relay racks or other suitable framework in any well-known manner. In passing, it should be understood that, according to preference or need, the bare-wire multiple panel assembly may be equipped with more than or less than 10 bare-wire multiple panels 20; that each multiple group of each panel 20 may consist of more than or less than four bare wire conductors 22; and that the line multiple groups of the panels 20 may represent circuits other than subscriber line circuits, equally as well.

As previously indicated, each rectangular opening 21 of panel 20 accommodates one horizontally disposed wiper assembly 25 of one switch unit, to provide means whereby that particular switch unit can connect its associated trunk circuit with any one group of the vertically disposed line multiples of panel 20. Each panel 20 is, therefore, fitted with one wiper assembly 25 for each switch unit of the assembly, the wiper assemblies 25 being securely mounted on panel 20 in the following manner. The left-hand end of wiper assembly 25 is bolted to panel 20 by means of bolt 27 passing through aligned mounting holes in wiper assembly 25, slotted spacer strip 18 and back plate 19, as shown in the sectional view of Fig. 5. The equivalent mounting hole at the right-hand end (Fig. 15) of wiper assembly 25, however, is threaded so that the bolt (such as 27) can be inserted from the rear of panel 20 instead of from the front (not shown) through the aligned mounting holes in back plate 19 and slotted spacer strip 18 to engage the threads in the right-hand mounting hole of wiper assembly 25, in order to avoid interference with the multiple conductors at the right-hand end of wiper assembly 25 (see Fig. 4).

The arrangement of wiper assembly 25 can best be seen in Figs. 1, 4, 5 and 6. Each wiper assembly 25 consists essentially of a horizontally disposed back mounting plate 24, which is securely attached to the framework of the panel 20 assembly, and a horizontally disposed specially formed channel 26 for mounting the four trunk circuit conductors of the wiper assembly in position.

Figure 8:
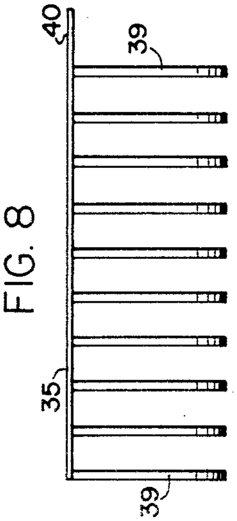
Fig. 8 is a top view, in elevation, of one of the strip conductors of each wiper assembly, showing the one-piece construction of the conductor.
Figure 9:
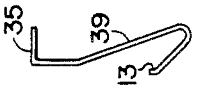
Fig. 9 is a side view, in elevation, of the conductor of Fig. 8, showing the formed contour of the 10 depending wiper members.

The four trunk circuit conductors 35, 36, 37 and 38 (Fig. 6) of wiper assembly 25 are insulated from each other and from channel 26 by means of suitable strip insulators, and are securely anchored in the top horizontal recess of channel 26. Each horizontally disposed trunk circuit conductor, such as 35, has 10 vertically disposed and spaced wiper members such as 39, depending therefrom, each depending wiper member hanging down in front of one vertically disposed bare wire conductor 22 of each of the 10 line circuit multiple groups, said vertically disposed conductor 22 being the same relative conductor of all 10 line circuit multiple groups. Each horizontally disposed trunk circuit conductor, such as 35, and its 10 depending wiper members are stamped and formed from a single piece of spring stock, as shown in Figs. 8 and 9, and, therefore, this horizontal conductor serves to multiple the 10 depending wiper members together.

Figure 3:
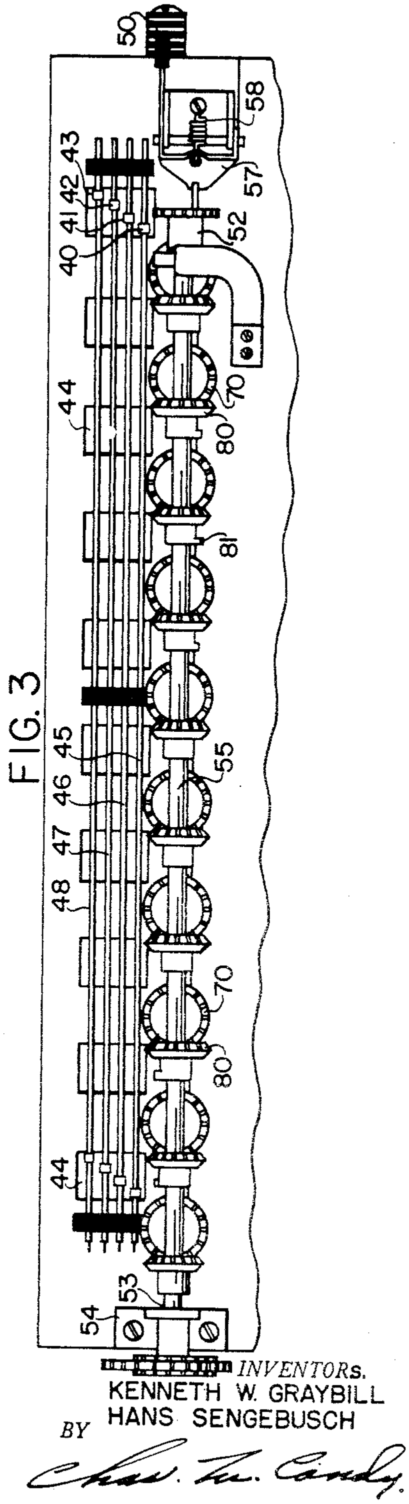
Fig. 3 is a partial rear view, in elevation, showing the primary driving shaft of the uppermost switch unit and the horizontally disposed bare-wire multiple which connects all of the horizontally disposed wiper assemblies associated with the uppermost switch unit together.
Figure 4:
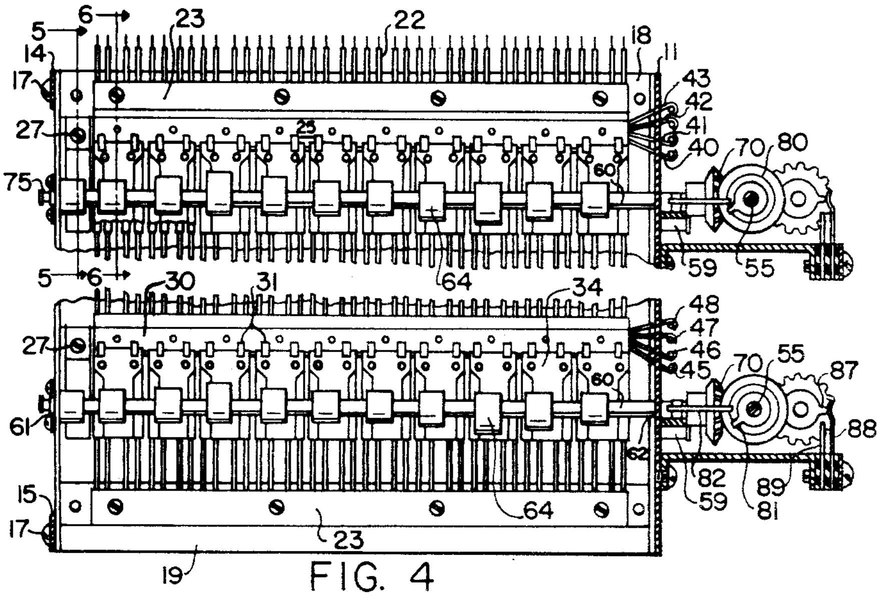
Fig. 4 is a sectional view taken along the line 4—4 in Fig. 1 showing the relationship of the first panel of vertically disposed bare-wire multiples with the uppermost switch unit and the bottom switch unit, the secondary, or cam, shaft of the uppermost and the bottom switch units and also the associated cams, cam followers and wiper-actuator plates.

The vertically disposed depending wiper members of the trunk circuit conductors 35–38 are so tensioned that in the normal, or non-operated, position the free ends, such as 13, are close to but clear of the related line circuit conductor 22, as shown in Fig. 6. When any group of four depending wiper members of trunk circuit conductors 35–38 are flexed in the manner to be described presently, the free ends of the four depending wiper members are pressed into sliding contacts with the four bare wire conductors 22 of the particular line circuit multiple group. The right-hand ends 40–43 of the horizontally disposed trunk conductors 35–38 pass through an opening 44 in back plate 11 and are soldered or otherwise connected to the four horizontally disposed conductors 45–48 insulatingly mounted on the rear of back plate 11, as shown in Figs. 3 and 4. The horizontally disposed conductors 45–48 are connected to terminals of wiring of the related switch unit trunk circuit, as desired.

The switch units mounted on the bare-wire multiple panel assembly lie in parallel horizontal planes one above the other in the manner shown in Fig. 2. The number of switch units to be mounted on the multiple panel assembly is generally determined by the number of simultaneous connections required with the 100 multiple line groups of the 10 bare-wire multiple panels 20, limited only to the required maximum height of the assembly. The number of switch units mounted on the bare-wire multiple panel assembly will, therefore, vary according to circumstances as, for example, 13 switch units are frequently associated with 100 line multiple groups as represented by the 10 panels 20. Each switch unit mounted on the assembly is self-contained and independent of the other switch units.

Since in the present embodiment the assembly is considered as being fitted with 10 bare-wire multiple panels 20, each switch unit on the assembly is equipped with one wiper assembly 25 for each of the 10 panels 20, or a total of 10 wiper assemblies 25. The 10 wiper assemblies for each switch unit are mounted on the 10 related openings 21 of the 10 panels 20 in the manner previously explained, and the four conductor terminals, such as 40–43, of each of the 10 wiper assemblies 25 are brought through openings 44 in back plate 11 and connected to the related four horizontally disposed conductors, such as 45–48, in the manner also previously explained. It will thus be seen that each switch unit of the assembly has wiper facilities for connecting its trunk circuit to any of the 100 line multiple groups constituting the 10 panels 20.

Figure 16:
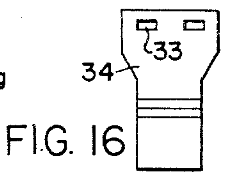
Fig. 16 is a front view of one cam follower element showing the bearing slots for hingedly mounting the cam follower on the wiper assembly.

Referring now to Figs. 4, 6, and 16, member 30 of each wiper assembly 25 has 20 suitably spaced lugs 31 for suspending 10 rectangular shaped cam follower plates 34, through the media of 20 loosely fitting slots 33 in the plates 34. Each cam follower plate 34 is fitted with a wiper actuator plate 32 riveted or otherwise suitably attached to cam follower plate 34. Each actuator plate 32 is fabricated of suitable insulating material, and is of sufficient width to span the four related wipers 39.

Each wiper unit of the assembly is equipped with a primary shaft 55; a plurality of secondary shafts 60 (10 secondary shafts in this embodiment); a pulse-operable motor 65 for driving shaft 55 through a suitable train of gears to cause shaft 55 to select one of the secondary shafts 60 according to the value of a received series of impulses; and an electromagnet 56 for shifting a common trigger bar 59 longitudinally to the left from the normal position shown in Fig. 1 (after shaft 55 has been rotated to select one of the secondary shafts 60) to cause the selected secondary shaft 60 to engage the primary shaft 55.

Considering now the primary shaft 55 of each switch unit, the shaft is suitably bearinged at a point such as 51 (Fig. 1) in bracket 52 mounted near the left-hand end of back plate 11, and also at a point such as 53 in bracket 54 mounted at the right-hand end of back plate 11. Between the bearing points, primary shaft 55 is fitted with 10 bevel gears 80 suitably spaced along shaft 55 to be respectively aligned with 10 corresponding bevel gears 70 of the 10 secondary shafts 60 of the switch unit.

The hubs of the 10 gears 80 of primary shaft 55 are each fitted with a protruding stud, or cam, 81, arranged for selecting one of 10 bell crank triggers 82 preparatory to meshing gear 70 of the related secondary shaft 60 with the corresponding gear 80 of primary shaft 55, in the manner to be presently explained. The 10 gears are so set on primary shaft 55 that the related studs 81 are spaced one-eleventh of a revolution apart with respect to the circumference of shaft 55, thus leaving two-elevenths of a revolution spacing between studs #10 and #1. The double spacing between studs #10 and #1 provides a normal, or home, position for shaft 55 which is not fitted with a stud 81. Shaft 55 is so positioned with respect to the gear train of motor 65 that with motor 65 in the normal, or home, position, stud #1 (the stud 81 of the first gear 80 to the left in Figs. 1 and 10) is located just below and short of being horizontally aligned with the upper tip end of the first trigger 82.

Now when motor 65 is pulsed one step from its home position, the resulting rotating of shaft 55 one step moves stud 81 of the first gear 80 sufficiently upward to horizontally align this stud #1 with the upper tip end of the first trigger 82. In a similar manner, stud 81 of the second gear 80 would be horizontally aligned with the upper tip end of the second trigger 82 should motor 65 be pulsed two steps from its home position instead of one step, and stud 81 of the third gear 80 would be horizontally aligned with the tip end of the third trigger 82 should motor 65 be pulsed three steps from its home position instead of one step, etc., . . . 10 steps from its home position being required of motor 65 to align stud 81 of the tenth gear 80 with the upper tip end of the tenth trigger 82. The aligning of any one of the 10 studs 81 with its respective trigger 82 constitutes a selection of that particular trigger 82 to the exclusion of the other nine triggers 82.

Considering next the secondary shafts 60 of each switch unit, each secondary shaft 60 is slidingly bearinged at points such as 61 and 62 respectively (Fig. 1). A bevel gear 70 is fixedly attached to the end of secondary shaft 60 nearest primary shaft 55 (Figs. 1, 10 and 11), and is adapted for engaging a corresponding gear 80 of primary shaft 55 when secondary shaft 60 is shifted longitudinally towards primary shaft 55. Any one of the 10 secondary shafts 60 will, therefore, be rotated in unison with primary shaft 55 whenever the respective bevel gears 70 and 80 are held in mesh and motor 65 is then additionally pulsed to cause a further rotation of primary shaft 55.

Between the bearing points, each secondary shaft 60 is fitted with 11 cams 64 spirally spaced along the length of shaft 60 one-eleventh of a revolution apart with respect to the circumference of the shaft. Ten of the cams 64 (designated as cam #1 to #10 inclusive in Fig. 1) are for the purpose of operating the respective 10 cam follower plates 34 of the related bare-wire multiple panel 20, and the eleventh cam (designated as cam #11 in Fig. 1) provides facilities for controlling a special contact spring group 63 (Figs. 1, 2, 12 and 13) not related to the bare-wire multiple, and intended for use as "off-normal" contacts. The spacing of the cams 64 one-eleventh of a revolution apart provides two-elevenths of a revolution spacing between cams #10 and #1. The double spacing between cams #10 and #1 provides a normal, or home, position for the secondary shaft 60. The cams #1 to #10, inclusive, are so located on shaft 60 that, when shaft 60 is in the home position, cam #10 is just clear of the related cam follower plate 34 in a position to operate that cam follower plate 34 when shaft 60 is rotated one step from its home position. The 11 cams 64 are of sufficient width to correspond with the respective cam followers when secondary shaft is shifted longitudinally to cause gear 70 of secondary shaft 60 to mesh with the related gear 80 of primary shaft 55.

Figure 13:
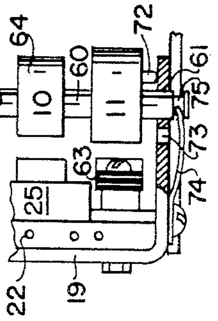
Fig. 13 is an enlarged view similar to that shown in Fig. 12 with the general exception that the secondary shaft has been lifted from its normal, or home, position and rotated according to the value of a received dialed digit.
Figure 12:
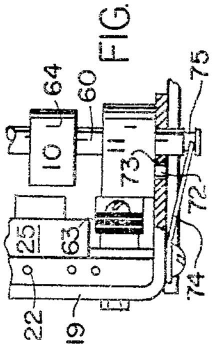
Fig. 12 is an enlarged view of the lower left-hand corner of the uppermost switch unit shown in Fig. 1 illustrating the mechanism for locking a secondary shaft in its normal, or home, position.

Each secondary shaft 60 is locked in the home position by means of a stud 72 (fixedly attached to the eleventh cam 64) engaging a corresponding hole 73 in the elongated web member of back plate 19 of the respective bare-wire multiple panel 20, as shown in Fig. 12. A spring 74 tensioned in the direction away from secondary shaft 60 and engaging a slot 75 at the end of secondary shaft 60 maintains stud 72 in hole 73, thereby locking the shaft against rotation. As gear 70 of secondary shaft 60 is caused to mesh with the corresponding gear 80 of primary shaft 55, in the manner to be presently explained, stud 72 is withdrawn from hole 73 thus freeing secondary shaft 60 for rotation. When secondary shaft 60 is rotated in unison with primary shaft 55, the tip end of stud 72 rides on the surface of the elongated web member of back plate 19 (as shown in Fig. 13) to maintain the two gears 70 and 80 in mesh. Since only one secondary shaft 60 can mesh its gear 70 with the corresponding gear 80 of primary shaft 55 at one time, it is obvious that the other nine secondary shafts 60 remain in the respective home positions locked against rotation.

Assuming now that gear 70 of the secondary shaft 60 to the left in Fig. 1 (#1 secondary shaft 60) has been meshed with the first gear 80 of primary shaft 55, then a second dialled digit will cause motor 65 to rotate primary shaft 55 and #1 secondary shaft 60 in unison according to the value of the second dialled digit. This further rotating of primary shaft 55 has no effect on the nine secondary shafts 60 locked in the respective home positions. As #1 secondary shaft 60 starts to rotate, the #10 cam 64 actuates the related cam follower plate 34, thereby to cause the #10 wiper actuating plate 32 attached to the #10 cam follower plate 34 to urge the four related wiper springs 39 into contact with the respective bare wire conductors 22. Should there be no further stepping of #1 secondary shaft 60, then #10 cam 64 continues to retain #10 cam follower plate 34 actuated. Should #1 secondary shaft 60 be rotated two steps instead of one step, then #10 and #9 cams 64 successively actuate the related cam followers 34, and should there be no further stepping of #1 secondary shaft 60 then #9 cam follower 34 is retained actuated by the #9 cam 64. In like manner, the stepping of #1 secondary shaft 60 three steps from the home position causes the successive actuation of the #10, #9 and #8 cam followers 34 and the retention of #8 cam follower 34 in the actuated position, etc., . . . 10 steps of #1 secondary shaft 60 being required for successively actuating all 10 cam followers 34 and the retention of #1 cam follower 34 in the actuated position. Whenever a cam 64 of #1 secondary shaft 60 retains the related cam follower plate 34 in the actuated position (upon the completion of the rotating of #1 secondary shaft 60), the wiper actuator plate 32 attached to the actuated cam follower plate 34 presses its four wiper springs 39 (representing the trunk circuit of the switch unit) into contact with the four associated conductors 22 (representing a subscriber line circuit) of the bare-wire multiple panel 20.

The operation of contact spring group 63 associated with #1 secondary shaft 60 is as follows: The #11 cam 64 of #1 secondary shaft 60 rests against a bushing or the like on the cam follower spring of contact spring group 63, to maintain the contact springs 63 open during the periods #1 secondary shaft 60 is in the home position. As #1 secondary shaft 60 is moved away from its home position and then rotated in unison with primary shaft 55, the #11 cam 64 moves away from the cam follower spring of contact spring group 63, with the result that the contact springs come together and the contact becomes closed. The contact remains closed until #1 secondary shaft 60 is ultimately restored to the home position, in the manner to be subsequently described, and #11 cam 64 will then engage the cam follower spring of contact spring group 63 to open the contact as secondary shaft 60 returns to the normal position. It is obvious that contact spring group 63 controlled by cam #11 of #1 secondary shaft 60 may consist of any desired number and arrangement of contact springs, and may be utilized for any desired circuit purpose.

In like manner to that described in the preceding paragraphs of this specification, any one of the other nine secondary shafts 60 of the switch unit can be selected, meshed with the primary shaft 55, and then rotated in unison with primary shaft 55 to cause a particular cam 64 of the rotated secondary shaft 60 to retain the related cam follower plate 34 actuated, thereby to connect the four wiper springs 39 controlled by said particular cam 64 with the four associated conductors 22 of the particular bare-wire multiple panel 20. It should be understood at this time that only one secondary shaft 60 of the switch unit can be in use at one time. It should be further understood, however, that one secondary shaft 60 of two or more of the switch units mounted on the assembly of bare-wire multiple panels 20 can be in use simultaneously, as each such switch unit is self-contained and independent of the other switch units.

The trigger bar 59 (Fig. 1) common to the 10 secondary shafts 60 of each switch unit is slidingly bearinged in any suitable manner on back plate 11 so that it can be operated longitudinally in either direction, a suitable stop (not shown) at the right-hand end of back plate 11 limiting its movement to the right. The tip end of armature 57 engages a slot 79 at the left-hand end of trigger bar 59, and moves trigger bar 59 to the left whenever magnet 56 is energized. A spring 58 causes armature 57 to return trigger bar 59 to the right-hand, or home, position upon the releasing of an established switching connection. Magnet 56 is suitably mounted at the left-hand end of back plate 11, and carries a contact spring assembly 50 operable by armature 57 for any desired circuit purpose. The 10 triggers 82 are pivotally mounted on trigger bar 59 at points such as 83 with springs 84 tensioning the lower tip ends of the triggers 82 against the hub of the respective gears 70.

As trigger bar 59 is moved to the left by suitable energization of magnet 56 in the manner explained in the preceding paragraph, the 10 triggers 82 are correspondingly carried to the left with trigger bar 59. It should be understood at this time that magnet 56 is only energized after primary shaft 55 has been rotated according to the value of a dialed digit to cause the stud 81 of one of the 10 gears 80 of primary shaft 55 to become aligned with, and thereby select, the related trigger 82. The end of the aligned stud 81 engages the tip end of the selected trigger 82 (Fig. 11) and, as trigger bar 59 is moved to the left by armature 57, the aligned stud 81 maintains contact with the tip end of the selected trigger 82. As a consequence, the selected trigger 82 pivots at point 83, and the lower tip end of the trigger is moved in the direction of primary shaft 55 thereby urging gear 70 of the related secondary shaft 60 into mesh with the associated gear 80 of primary shaft 55. The upper tip ends of the nine non-selected triggers 82 clear the hubs of the related gears 80 of primary shaft 55 as they are moved to the left (because the respective lugs 81 are not in alignment with the upper tip ends of these nine triggers 82) and, consequently, no other gear 70 of the other nine secondary shafts 60 can be meshed with a gear 80 of primary shaft 55 at this time.

Figure 10:
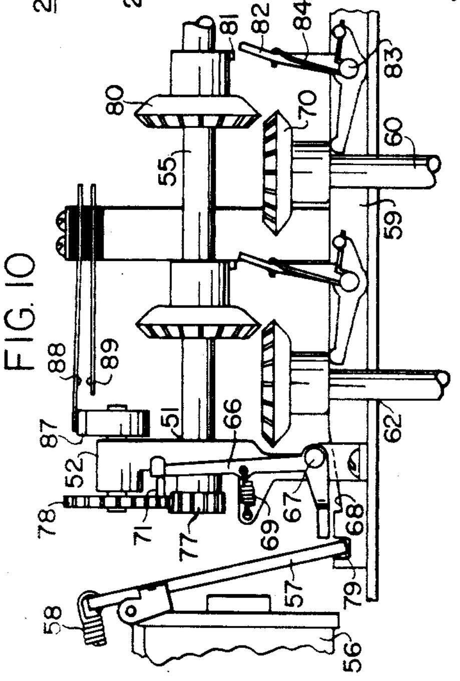
Fig. 10 is an enlarged view, in elevation, of the first and second gears of the primary shaft of the uppermost switch unit and the associated gears and trigger mechanism of the first and second secondary shafts, with the gears shown in the normal, or non-engaged, position.
Figure 11:
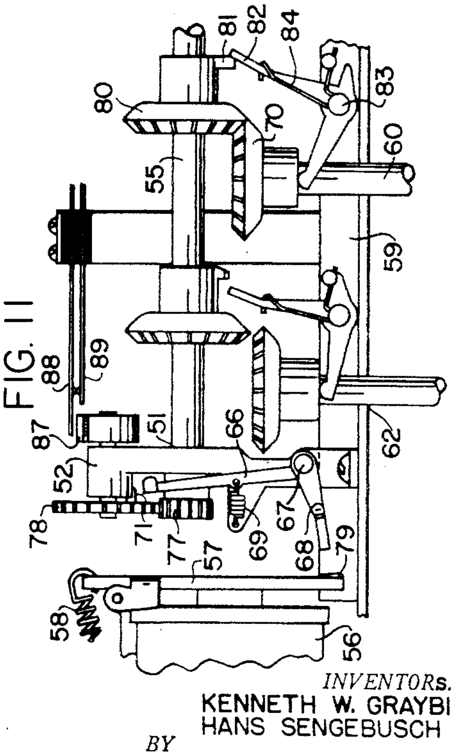
Fig. 11 is an enlarged view, in elevation, similar to that of Fig. 10 but with the gear of the second secondary shaft shown meshed with the respective gear of the primary shaft.

A bell crank latch 66 (Figs. 1, 10 and 11) pivotally mounted on bracket 52 at 67 provides means for locking trigger bar 59 in the operated left-hand position. When trigger bar 59 is in the normal right-hand position, the lower tip end of latch 66 is held clear of the outer edge of trigger bar 59 through the medium of pin 71 engaging the upper tip end of latch 66 (as shown in Fig. 10), and trigger bar 59 is, therefore, free to be moved to the left by armature 57 of magnet 56. As trigger bar 59 is moved to the left and reaches its extreme left-hand position, the lower tip end of latch 66 drops into the cut-out 68 of trigger bar 59 (as shown in Fig. 11) because pin 71 moves away from the upper tip end of latch 66 with the first movement of primary shaft 55. Trigger bar 59 is thus locked in the left-hand position, spring 69 supplying the power to move and retain the lower tip end of latch 66 in cut-out 68. Magnet 56 can then be deenergized at any suitable time thereafter and latch 66 will maintain trigger 59 in the left-hand position, thereby retaining the meshed gears 70 and 80. A further rotation of primary shaft 55 will then cause the meshed secondary shaft 60 to rotate in unison with primary shaft 55 according to the value of a second dialled digit. Stud 81 of the meshed gear of primary shaft 55 moves away from its related trigger 82 when the meshed secondary shaft 60 is rotated, and this particular trigger 82 then pivots at 83 to the position shown in Fig. 11 for the trigger 82 at the left. Gear 70 of the rotating secondary shaft 60 is held in mesh with the related gear 80 of primary shaft 55, however, by the tip end of stud 72 of the rotating secondary shaft 60 riding on the surface of the elongated web member of back plate 19, as previously explained and as shown in Fig. 13.

Each switch unit is further equipped with an "off-normal" contact spring subassembly which opens its contact when the related primary shaft 55 is in the home position, and closes its contact when primary shaft 55 is stepped from the home position by motor 65, the contact then remaining closed until primary shaft 55 again reaches the home position. This off-normal contact spring subassembly may be identified in Figs. 1, 10 and 11 by the following described reference characters. Follower gear 78 is permanently meshed with sprocket gear 77 of primary shaft 55 and provides the medium for controlling the off-normal contact. A cam 87 of insulating material operating on the shaft of follower gear 78 retains contact spring 88 in a flexed condition during the periods primary shaft 55 is in the home position, thereby to disconnect contact spring 88 from contact spring 89. As primary shaft 55 is rotated from its home position, follower gear 78 causes cam 87 to leave contact spring 88, and contact spring 88, therefore, makes contact with contact spring 89. The gear ratio of gears 77 and 78 is such that cam 87 does not again reach and again flex contact spring 88 until primary shaft 55 again reaches its home position. The primary shaft off-normal contact of the switch unit is, therefore, open during the periods primary shaft 55 is in the home position, closes when primary shaft 55 is stepped from the normal position, and remains closed until primary shaft 55 again reaches the normal position. It is obvious that the off-normal contact spring subassembly of the primary shaft may consist of any desired number and arrangement of contact springs.

Figures 14, 15:
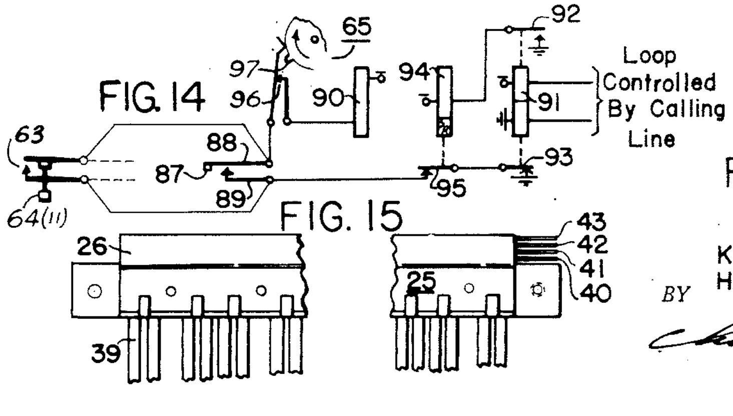
Fig. 14 shows a typical self-interruption homing circuit arrangement for causing the automatic returning of an operated switch unit to its normal, or home, position.
Fig. 15 is a fragmentary front view of one wiper assembly of a switch unit.

Considering now the pulse-operable motor 65, this motor is shown in block form on the drawings, as any type of suitable uni-directional stepping motor which rotates its armature through a given angle responsive to each received impulse, such as, for example, the electromagnetically-operated driving mechanism disclosed in British Patent No. 649,427, may be employed. The interrupter springs 96 of motor 65, however, are wired as indicated in Fig. 14, in order that motor 65 may be pulsed by subsequent self-interruption after having been operated by received impulses, to return itself to the normal, or home, position. In the particular embodiment disclosed in this specification, motor 65 requires a total of 22 operations, or steps, to drive shaft 55 through one complete cycle . . . for example, should motor 65 be operated six steps by one received series of three impulses to correspondingly rotate primary shaft 55 three steps, and then further operated four steps by a second received series of two impulses to correspondingly rotate primary shaft 55 and secondary shaft 60 two steps in unison, then six impulses and six interruptions of springs 96 through the medium of cam 97 are later required to "home" shaft 55 to its home position. It should be understood that the illustrations of springs 96 and cam 97 are typical only, as the form and arrangements of these two units may vary according to the particular type of motor employed.

A switch unit of the present invention, when used for establishing a switching connection as described in this specification, is restored to the normal position in the following manner. Referring to Figure 14 which illustrates the principles of the self-interruption homing circuit arrangement for motor 65, the interrupter springs and associated cam operable by the shaft of motor 65 are identified by the reference characters 96 and 97, respectively; the effective operating winding of motor 65 is identified by the reference character 90; the cam and the two contact springs of the primary shaft's off-normal contact spring subassembly are respectively identified by the reference characters 87, 88 and 89; and the secondary shaft's off-normal cam and contact springs are respectively identified by the reference characters 64 (11) and 63. Relays 91 and 94 in Figure 14 are similar to the well-known "line" and "release" relays of a Strowger switch, for example, and are controlled over a calling line in well known manner. The circuit for the self-interruption of motor 65 is open at the off-normal contact spring 63, 88 and 89 during all periods when shafts 55 and 60 are in the home position.

Now when motor 65 steps primary shaft 55 of the switch unit from its home position responsive to a series of impulses impressed upon the effective winding 90 of motor 65 in desired manner, cam 87 (Figures 10, 11 and 14) leaves contact spring 88 as previously explained and, consequently, contact spring 88 makes contact with contact spring 89. Springs 63 make contact similarly when the associated shaft 60 is stepped off normal. The contacting of springs 63, 88 and 89, however, does not complete the self-interruption homing circuit of motor 65 because the operation of line relay 91 in well-known manner when the switch unit was "seized" by the calling line, for example, opens another point in the homing circuit at armature 93 while contact springs 63, 88, 89 are still open. The homing circuit remains in the ineffective condition during the remainder of the operation of the switch unit and until the calling line opens the loop circuit of line relay 91 by abandoning the established switching connection.

Responsive to the restoring of line relay 91, armature 93 closes a point in the homing circuit and, after a short interval, release relay 94 restores in well-known manner to complete the homing circuit at armature 95. The completed homing circuit may be traced from ground, armature 93, armature 95, contact springs 89 and 88, contact springs 63 in multiple with springs 88 and 89, interrupter springs 96, winding 90 of motor 65 to battery. Motor 65 correspondingly starts stepping its shaft and, by means of cam 97 operated in a manner determined by the particular type and design of motor 65, causes interrupter springs 96 to open the homing circuit of motor 65. As the shaft of motor 65, however, completes its first step, cam 97 is caused to re-close the interrupter springs 96 and motor 65 advances its shaft another step, with corresponding opening and reclosing of interrupter springs 96. In this manner, motor 65 continues to step its shaft until primary shaft 55 reaches its home position. When primary shaft 55 reaches its home position, cam 87 flexes contact spring 88 away from contact spring 89, thus opening that portion of the homing circuit.

Returning now to the point in the homing of motor 65 where the homing circuit is completed for the first time, the subsequent self-driving of motor 65 causes the meshed primary and secondary shafts 55 and 60 to further rotate in unison, which unified rotation of both shafts is correspondingly continued. As secondary shaft 60 is being further rotated in this manner, stud 72 continues to ride the surface of the elongated web of back plate 19 of the respective bare-wire multiple panel 20 (see Figure 13) until stud 72 becomes aligned with hole 73 in said web member of back plate 19. At this instant, spring 74 (which has been additionally tensioned as shown in Figure 13) causes the disengagement of the meshed gears 70 and 80, and stud 72 is forced into hole 73 to lock restored secondary shaft 60 in the home position. Off-normal springs 63 thereupon open their portion of the homing circuit. Motor 65 continues to rotate primary shaft 55 until primary shaft 55 reaches its home position, whereupon cam 87 flexes contact spring 88 away from contact spring 89, thus opening the homing circuit of motor 65 and stopping further rotation.

If shaft 55 reaches its home position before shaft 60 does so, however, the first opening of contacts 88, 89 will be ineffective, since contacts 63 are still closed. Shaft 55 will accordingly step off normal again and make another complete rotation, until brought to rest as in the preceding paragraph.

As primary shaft 55 reaches its home position, pin 71 engages the upper tip end of latch 66 (Fig. 10), thereby forcing the upper tip end of latch 66 to the right. Latch 66, therefore, pivots at 67 and raises the lower tip end of latch 66 out of, and clear of, cut-out 68 in trigger bar 59 (Figure 10). Spring 58, consequently, causes armature 57 to return trigger bar 59 to the right-hand home position.

While there has been described what is at present considered to be a preferred embodiment of the invention, it should be understood that various modifications may be made in the structure thereof, and it is contemplated in the appended claims to cover all such modifications as fall within the true spirit and scope of the invention.

What is claimed is:

1. In an automatic switch, a first rotatable shaft having a home position, a plurality of second shafts each having a home position, a plurality of groups of contact actuators, individual locking means locking said second shafts in the respective home positions, impulse-operable driving means, said driving means operated responsive to a received series of impulses to rotate said first shaft from its home position according to the value of said received series of impulses, means for selecting one of said locked second shafts, means whereby said last means is operated responsive to said rotation of said first shaft, coupling means for rotatively coupling said selected second shaft with said rotated first shaft, activating means for moving said selected shaft from its home position thereby to operate said locking means to unlock said selected second shaft and to cause said coupling means to become effective, means for operating said activating means, said driving means further operated responsive to another received series of impulses to rotate said two coupled shafts in unison, means for operating said groups of contact actuators, said last means effective responsive to said unified rotation of said two coupled shafts for operating one of said groups.

2. The automatic switch claimed in claim 1 together with maintaining means for maintaining said coupling of said two shafts independent of said activating means, and means operated responsive to said unified rotation of said second shaft for operating said maintaining means.

3. In an automatic switch, a first rotatable shaft, a series of coupling gears mounted on said shaft, a plurality of second rotatable shafts with gears individual to each, means individual to each said second shaft locking said second shafts against rotation, driving means for rotating said first shaft, means whereby said driving means is operated responsive to a received series of impulses to rotate the shaft according to the value of said received series of impulses, means for selecting one of said locked second shafts, means whereby said last means is operated responsive to the rotation of said first shaft, a movable bar, an electromagnet, means for energizing said magnet, means operated responsive to said energization of said magnet for moving said bar, means for unlocking said selected locked second shaft and for rotatively coupling said unlocked second shaft with said rotated first shaft by means of said gears means whereby said last means is operated responsive to said movement of said bar, means for locking said moved bar in said moved position, and means whereby said last means is operated responsive to said movement of said bar.

4. In an automatic switch, a primary shaft, a series of coupling gears mounted on said shaft, a plurality of secondary shafts with gears individual to each, a movable bar, a latch for locking said bar, means rendering said latch normally ineffective, impulse-operable means operated responsive to a received series of impulses to operate said primary shaft, means for selecting one of said secondary shafts, means whereby said last means is operated responsive to said operation of said primary shaft, means for disabling said first mentioned means to condition said latch for operation, means whereby said last means is operated responsive to said operation of said primary shaft, an electromagnet, means for momentarily energizing said magnet, means operated responsive to the energization of said magnet for moving said bar, means including said gears for coupling said selected secondary shaft and said operated primary shaft together, means whereby said last means is operated responsive to said movement of said bar, and means operated responsive to said movement of said bar for causing said conditioned latch to lock said bar in said moved position.

5. The automatic switch as claimed in claim 2 together with means for additionally pulsing said driving means to further rotate said coupled shafts in unison until said second shaft becomes aligned with its home position, means effective responsive to said alignment with said home position for causing the disengagement of said maintaining means, and means operated responsive to said disengagement to return said aligned second shaft to its home position, to uncouple said further rotated second shaft from said further rotated first shaft, and to render said locking means effective to lock said returned second shaft in its home position.

6. The automatic switch claimed in claim 3 wherein said driving means is further operated responsive to a second received series of impulses to rotate said two coupled shafts as one unit, maintaining means for maintaining said coupling of said two shafts independently of the original coupling means controlled by said bar, means whereby said maintaining means is operated responsive to said unitary rotation of said coupled second shaft, means whereby said original coupling means is released responsive to said unitary rotation of said coupled first shaft, pulsing means for additionally pulsing said driving means to further rotate two coupled shafts until said second shaft becomes aligned with its home position, means effective responsive to said alignment to disable said maintaining means, and means operated responsive to said alignment to return said aligned second shaft to its home position, and to uncouple said further rotated second shaft from said further rotated first shaft.

7. In an automatic switch, a primary shaft, a series of coupling gears mounted on said shaft, a plurality of secondary shafts with gears individual to each, impulse operable means operated responsive to a received series of impulses to operate said primary shaft, means for selecting one of said secondary shafts, means whereby said last means is operated responsive to said operation of said primary shaft, a bar having two positions, an electromagnet, means operated responsive to a momentary operation of said magnet for moving said bar from one of said positions to the other, means for blocking said bar in said other position, means whereby said last means is operated responsive to said movement of said bar, means for coupling the gear of said selected secondary shaft with a gear of said operated primary shaft, means whereby said last means is operated responsive to said movement of said bar, said impulse operable means further operated responsive to a second received series of impulses to operate said two coupled shafts in unison, retaining means for retaining said coupling of said two shafts, means whereby said retaining means is made effective responsive to said unified operation of said shafts, means for additionally pulsing said impulse operable means to further operate said two coupled shafts in unison until both said coupled shafts have been aligned with their home positions, means whereby said shaft retaining means is released responsive to said alignment of said secondary shaft with its normal position, and means whereby said bar locking means is released responsive to said alignment of said primary shaft with its normal position.

8. The automatic switch as claimed in claim 4 wherein said impulse operable means is further operated responsive to another received series of impulses to operate said two coupled shafts in unison, together with retaining means for retaining said coupling of said two shafts, means whereby said retaining means is operated responsive to said unified operation of said coupled secondary shaft, means to further operate said two coupled shafts in unison until said coupled secondary shaft becomes aligned with its home position, means operated responsive to said alignment for uncoupling said two further operated shafts upon each other, said pulsing means further pulsing said impulse operable means to restore said uncoupled primary shaft to normal, and means operated responsive to said restoration of said primary shaft for releasing said latch to unlock said moved bar.

9. The automatic switch claimed in claim 8, together with means for restoring said unlocked bar to its normal position, and said last means operated responsive to said release of said latch.

10. In a switching device, a primary rotatable shaft, a plurality of coupling gears mounted on said shaft, a plurality of secondary shafts, an individual gear mounted on each of said secondary shafts, means for locking each said secondary shaft against rotation, means for rotating said primary shaft to a predetermined position, means for selecting a particular one of said locked secondary shafts according to the positioning of said primary shaft, means whereby said selecting means is operated responsive to said positioning, a magnet, means for operating said magnet, means for unlocking said selected secondary shaft and for rotatively coupling said unlocked secondary shaft to said positioned primary shaft, means whereby said last means is operated responsive to said operation of said magnet, and means for rotating said two coupled shafts in unison.

References Cited in the file of this patent

UNITED STATES PATENTS

| Number | Name | Date |
| --- | --- | --- |
| 1,082,624 | Crouse et al. | Dec. 30, 1913 |
| 1,504,084 | Spencer | Aug. 5, 1924 |
| 1,725,044 | Aldendorff | Aug. 20, 1929 |
| 2,336,471 | Deakin | Dec. 14, 1943 |